Nov. 25, 1969        A. R. OSTARLY        3,479,830
ANCHORING MACHINE
Filed April 20, 1967        3 Sheets-Sheet 2
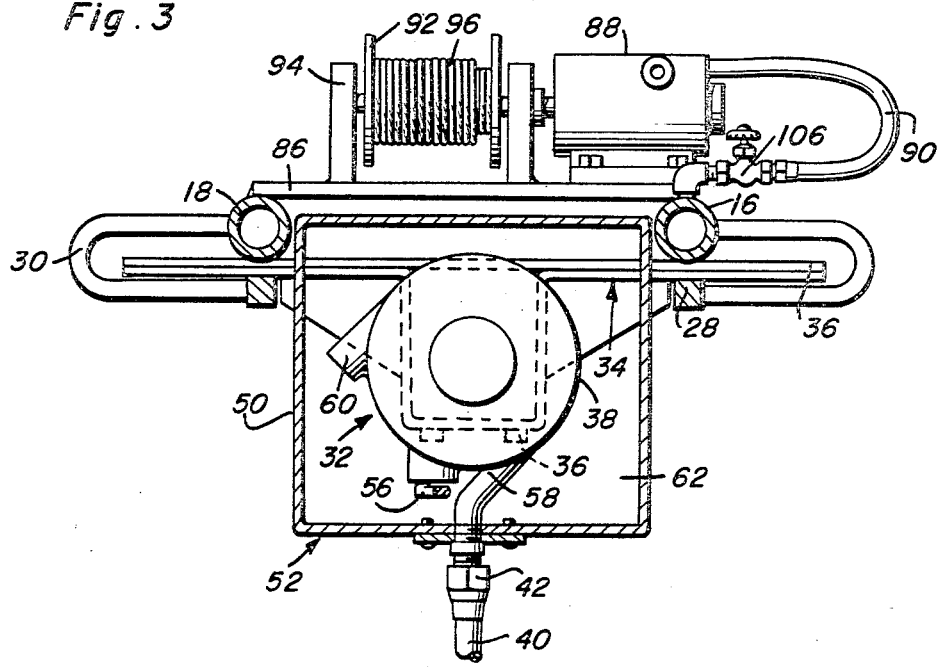
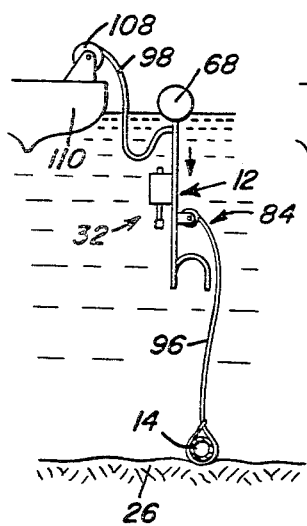
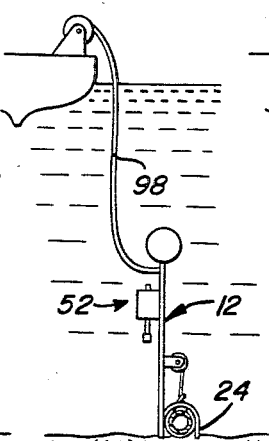
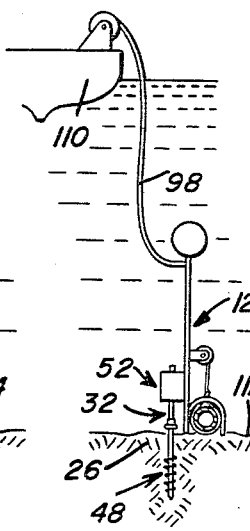
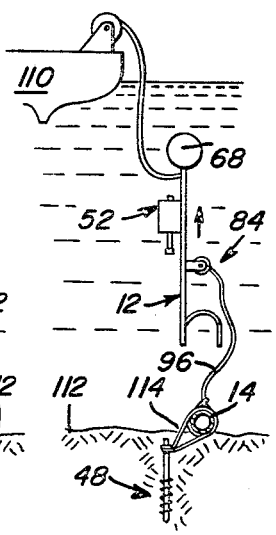
Adam R. Ostarly
INVENTOR.

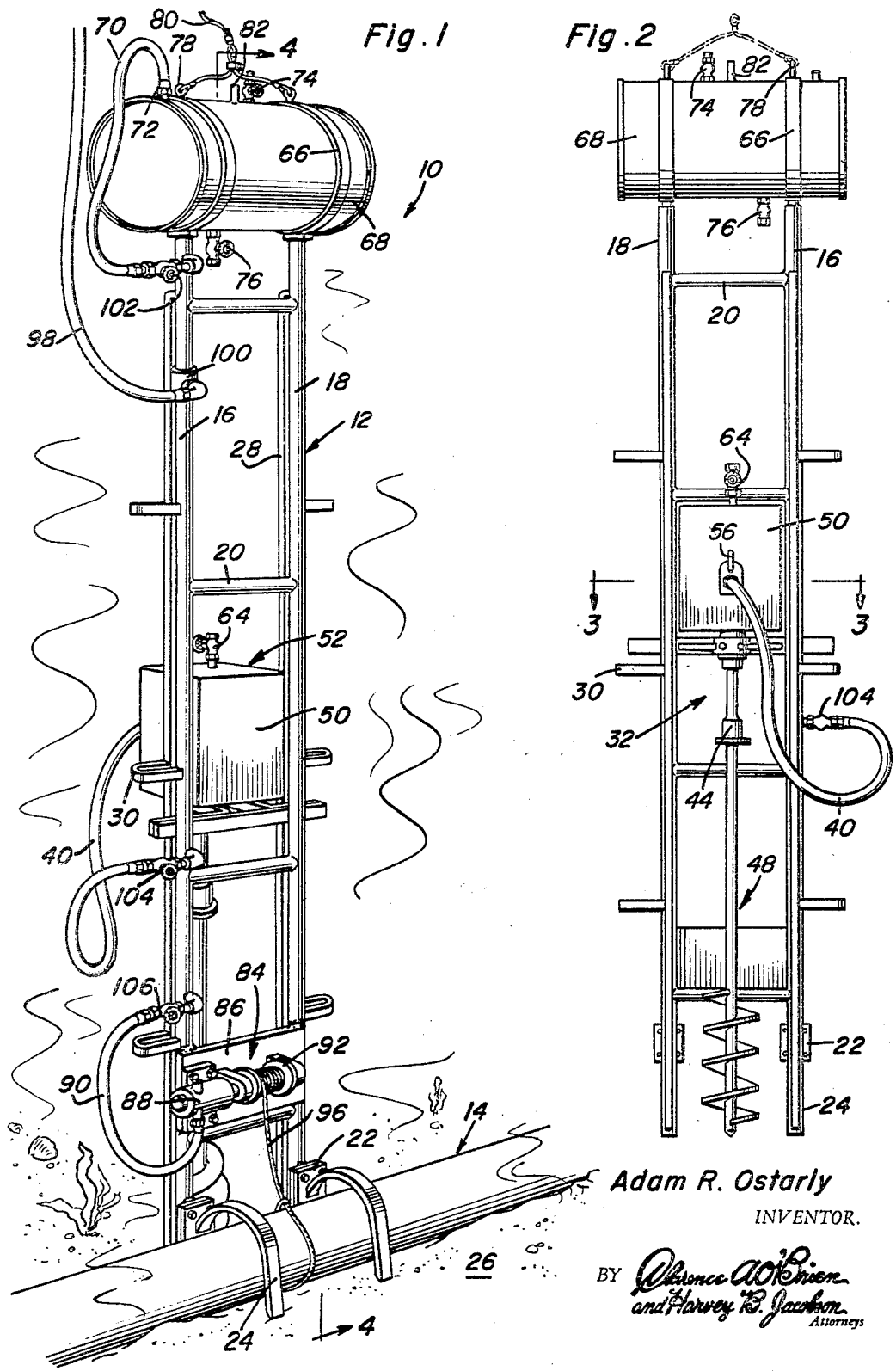

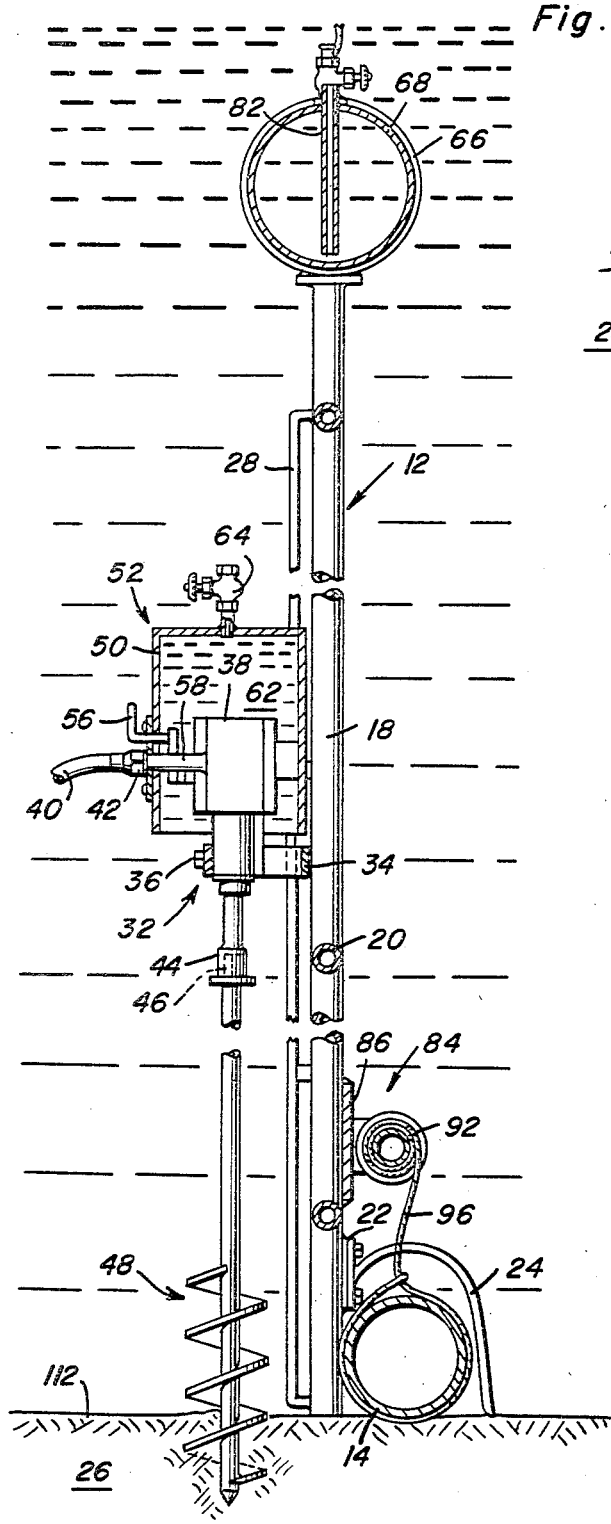

United States Patent Office 3,479,830
Patented Nov. 25, 1969

3,479,830
ANCHORING MACHINE
Adam R. Ostarly, New Orleans, La., assignor to Global Divers and Contractors, Inc., a corporation of Louisiana
Filed Apr. 20, 1967, Ser. No. 632,254
Int. Cl. E02d 5/74; B63b 21/26, 35/04
U.S. Cl. 61—72.3
17 Claims

ABSTRACT OF THE DISCLOSURE

The anchoring of pipe line lying on the floor of the ocean by driving a screw anchor into the floor bed and tying its upper end to the pipeline before the anchor is further driven below the mud line. Apparatus for driving the anchor is floated to a location above the pipeline and pulled down to the bottom surface so as to drive the anchor into the bed adjacent to the pipeline.

BACKGROUND OF THE INVENTION

This invention relates to a method and apparatus for anchoring of pipelines, communication cable, etc. to the ocean floor so as to prevent shifting due to heavy sea or ocean currents.

Underwater pipelines or cables have heretofore been anchored by methods and equipment that have been relatively expensive and have involved procedures that was time consuming and required an excessive amount of diving time.

Cable or pipelines have also been effected during installation by use of river weights, suspension above the ocean floor or by burying the cable under the ocean floor. Such methods are of course unsuitable for pipeline already lying on the ocean floor. The method utilized for anchoring pipeline already disposed under water, were either ineffective to prevent shifting of the pipeline under conditions prevailing on an ocean floor or involved costly and time consuming operations directed from anchored boats and involving expensive equipment.

The present invention therefore is addressed to the problem of establishing adequate anchors for existing pipeline resting on the floor of the ocean at a minimum cost and with a minimum amount of diving time.

SUMMARY OF THE INVENTION

In accordance with the present invention, an existing pipeline may be anchored to the ocean floor by operations directed from a unanchored boat from which fluid under pressure is supplied to apparatus controlled by a diver for driving a screw-type anchor into the ocean floor adjacent to the pipeline in order to anchor the same by means of straps or bands tying the pipeline to the anchor embedded below the mud line of the ocean floor.

The apparatus of the present invention is floated to a position above the pipeline and then submerged under the control of a diver by means of a haul-down cable connected to the pipeline and wound up upon a power operated winch associated with the apparatus. The apparatus thereby positions an anchor driving unit adjacent to the pipeline for driving the screw-type anchor into the ocean floor. The anchor driving unit is slidably mounted and is either upwardly retracted or downwardly urged by a buoyancy chamber device under control of the diver in order to perform the anchor driving operation. The anchor may thereby be driven into the ocean floor leaving an upper end portion thereof exposed so that it may be tied to the pipeline before the anchor is completely driven into the ocean floor below the mud line. The apparatus may then be refloated and moved to another position above the pipeline in order to again anchor the pipeline at another location.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWING FIGURES

FIGURE 1 is a perspective view of the pipeline anchoring apparatus associated with the present invention.

FIGURE 2 is an elevational view of the apparatus shown in FIGURE 1.

FIGURE 3 is a transverse sectional view taken substantially through a plane indicated by section line 3—3 in FIGURE 2.

FIGURE 4 is a longitudinal sectional view taken substantially through a plane indicated by section line 4—4 in FIGURE 1 showing the apparatus during the anchor driving phase of operation.

FIGURE 5 is a sectional view through the ocean floor showing the pipeline in an anchored condition.

FIGURES 6a through 6d are simplified schematic views of the apparatus during the various stages of the pipeline anchoring operation.

DESCRIPTION OF THE PREFERRED EMBODIMENT

Referring now to the drawings in detail, it will be noted from FIGURE 1 that the anchoring apparatus generally referred to by reference numeral 10 includes a vertically elongated track frame assembly 12 shown submerged and positioned adjacent to an existing pipeline 14. The track assembly 12 includes a pair of tubular posts 16 and 18 interconnected in parallel spaced relation to each other by a plurality of vertically spaced rungs. Connected to the lower ends of the posts, by the brackets 22, are a pair of legs 24 adapted to straddle the pipeline 14 so as to properly position the apparatus on the ocean floor 26 against the pipeline. Secured to each of the posts, substantially the length thereof, are guide rods 28, The opposite ends of which are secured as by welding to the posts. The guide rods are interconnected with the posts in parallel spaced relation thereto at vertically spaced locations by means of laterlly extending, U-shaped connectors 30. The guide rods 28 thereby form with the post 16 and 18, a pair of slide tracks for an anchor driving unit generally referred to by reference numeral 32.

Referring now to FIGURES 3 and 4 in particular, it will be observed that the anchor driving unit includes a support member 34 having lateral portions 36 which extend between the posts and the guide rods 28 for guided vertical movement past the connectors 30 disposed in straddling relation thereto. Fixedly secured to the support by fasteners 36, is a fluid motor 38 to which fluid under pressure is supplied for operation thereof by means of a supply conduit 40 coupled to the motor by the fitting 42. A socket member 44 is driven by the motor and extends downwardly therefrom in parallel spaced relation to the track assembly 12. The socket member is adapted to receive the upper, non-circular end portion 46 of an auger or screw-type anchor 48 as shown in FIGURES 4 and 5. It will be apparent therefore, that when fluid under pressure is supplied to the fluid motor 38, and it is downwardly urged, it will drive the anchor 48 into the ocean floor in a direction parallel to the track assembly 12 on which the anchor driving unit 32 is slidably mounted.

The fluid motor 38 is enclosed within an open bottom chamber housing 50 of a buoyancy control unit 52 associated with the anchor driving unit. A motor control element 56 is associated with the fluid motor 38 and projects from the housing 50 so that the motor may be selectively turned on or off. When the motor is turned on, fluid under pressure will enter the inlet 58 of the motor as shown in FIGURES 3 and 4, discharging from the outlet 60 into the buoyancy control chamber 62 enclosed by the housing 50. The chamber 62 when closed may thereby be filled with air so that the buoyant forces produced thereby will upwardly displace the anchor driving unit 32 in a retracting direction. The air within the chamber 62 may however be vented upon opening of a manually controlled exhaust valve 64. The full weight of the driving unit and the buoyancy control unit 54 will then be available to downwardly urge the anchor 48 as it is being rotated by the fluid motor 38.

Mounted on top of the track assembly 12 by means of the straps 66, is a ballast tank 68. The tank may be supplied with air through a supply conduit 70 connected to the top of the tank by a fitting 72. A pressure release vent valve 74 is also mounted on top of the tank while a manually controlled flood valve 76 is mounted on the bottom of the tank between the posts of the track assembly. Lift eyes 78 are also secured to the top of the tank by means of which a gant line 80 may be secured to the apparatus. The ballast tank is also provided with a salvage fitting 82. Thus, the apparatus is provided with a ballast device of a type well known by those skilled in the art so that it may be readily floated to a position above the pipeline.

Also mounted by the track assembly adjacent to the lower end thereof, is a power operated cable mechanism 84 by means of which the apparatus is drawn downwardly to the ocean floor. The cable mechanism is mounted on a plate 86 secured as by welding to the posts of the track assembly adjacent to the lower end thereof. As more clearly seen in FIGURES 1 and 3, the cable mechanism includes an air motor 88 fixedly mounted on the plate 86 to which air under pressure is supplied through the supply conduit 90 for driving a winch 92 in one direction, the winch being connected to the output shaft of the air motor and journaled between the brackets 94 on the plate 86. A cable 96 is adapted to be wound up by the winch so that when its free end is tied to the pipeline 14, the apparatus will be drawn down and guided by a diver to the position illustrated in FIGURES 1 and 4.

Air under pressure may be supplied from a surface source to the apparatus by means of the conduit 98 connected by the fitting 100 to one of the tubular posts 16 through which fluid under pressure is conducted to the various components supported by the track assembly. Thus, the ballast tank 68 may be blown dry by admitting air under pressure thereto through supply conduit 70 upon opening of the manual valve 102 which interconnects the tubular post 16 with the conduit 70. Fluid under pressure may similarly be supplied to the anchor driving unit and buoyancy control unit upon opening of the manual valve 104 which interconnects the supply conduit 40 with the post 16. Fluid under pressure for operating the winch motor 88 on the other hand is admitted to the supply conduit 90 through the manual valve 106 connecting the post to the supply conduit for this purpose. The valves 102, 104 and 106 may therefore be manipulated by a diver during a pipeline anchoring operation.

Referring now to FIGURES 6a through 6d, the operational procedure associated with the anchoring apparatus will become apparent. The apparatus as shown in FIGURE 6a, is floated by filling the ballast tank 68 with air under pressure to remove any water therefrom. Air is supplied from a source 108 from which the conduit 98 extends, the air pressure source being mounted on an unanchored boat 110. The apparatus is thereby floated to a position above the pipeline 14. A diver may then operate the control valve 106 so as to supply air under pressure to the winch motor 88 causing the cable 96 to wind up upon the winch 92 in order to pull the apparatus downwardly positioning it against the pipeline as shown in FIGURE 6b. The buoyancy chamber 62 of the buoyancy control unit 52 may then be charged with air through control valve 104 in order to upwardly displace the anchor driving unit to the position shown in FIGURE 6b. The anchor 48 is then inserted into the socket member 44 associated with the driving unit 32 and the buoyancy chamber 62 vented by opening of the exhaust valve 64 so as to apply the entire weight of the driving unit and buoyancy unit to the anchor in preparation for driving thereof into the ocean floor 26. The screw anchor is driven by rotation of the fluid motor 38 until the upper end thereof is within one foot of the mud line 112 as shown in FIGURE 6c. An anchoring strap 114 may then be wrapped around the pipeline 14 and secured by any suitable clamp 116 to the upper end of the anchor, after which the anchor is driven by the driving unit below the mud line to a position as more clearly seen in FIGURE 5. The driving unit is then displaced upwardly by supply of air under pressure to the buoyancy control unit 52 in order to retract the driving unit from the embedded anchor. The power operated cable mechanism 84 is then released by disconnecting the source of air under pressure therefrom so that the cable 96 may be slackened by the diver permitting the apparatus to rise to the surface under the buoyant forces imposed on the ballast tank 68 as shown in FIGURE 6d. Once the apparatus reaches the surface, the diver disconnects the cable 96 from the pipeline and moves it to another location along the pipeline as the apparatus thereabove floats with the boat 110 to the new location. The foregoing procedure may then be repeated in order to anchor the pipeline at the new location.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. Apparatus for anchoring an underwater pipeline to the bottom surface comprising a vertically elongated track assembly having upper and lower ends, leg means mounted by the track assembly adjacent said lower end for positioning the track assembly adjacent the pipeline on said bottom surface, ballast means mounted at the upper end of the track assembly for flotation thereof above the pipeline, power operated cable means mounted on the track assembly and adapted to be connected to the pipeline for submerging the track assembly, anchor driving means slidably mounted by the track assembly, and buoyancy control means connected to the anchor driving means for upwardly retracting and downwardly urging the anchor driving means.

2. The combination of claim 1 including a surface source of fluid under pressure, conduit means connecting said source to the power operated cable means and the buoyancy control means and valve means connected to the conduit means for selectively rendering the cable means and the buoyancy control means operative to submerge the track assembly and upwardly retract the anchor driving means.

3. The combination of claim 2 wherein said power operated cable means comprises an air motor fixedly mounted on the track assembly adjacent the lower end thereof, a winch driven by the air motor and a cable wound up upon the winch.

4. The combination of claim 3 wherein said buoyancy control means includes a downwardly opening housing mounting the anchor driving means and enclosing a air chamber therein, means for air venting the chamber underwater to downwardly urge the anchor driving means, said housing being connected to the conduit means for supplying air under pressure from said source to upwardly retract the anchor driving means.

5. The combination of claim 4 wherein said track assembly includes a pair of parallel spaced posts interconnected with each other, guide rods mounted on said posts in spaced relation thereto, and laterally extending connectors interconnecting the posts and the guid rods at vertically spaced locations straddling the anchor driving means.

6. The combination of claim 5 wherein said anchor driving means comprises a support extending laterally between the posts and the guide rods of the track assembly and mounting the buoyancy control means thereon, a fluid motor secured to the support within the buoyancy control means, and socket means driven by the fluid motor and extending downwardly therefrom below the support.

7. The combination of claim 1 wherein said buoyancy control means includes a downwardly opening housing mounting the anchor driving means and enclosing an air chamber therein, means for air venting the chamber underwater to downwardly urge the anchor driving means, and means for supplying air under pressure to the chamber to upwardly retract the anchor driving means.

8. The combination of claim 7 wherein said anchor driving means comprises a support mounting the buoyancy control means thereon, a fluid motor secured to the support within the buoyancy control means, and socket means driven by the fluid motor and extending downwardly therefrom below the support.

9. The combination of claim 8 wherein said track assembly includes a pair of parallel spaced posts interconnected with each other, guide rods mounted on said posts in spaced relation thereto, and laterally extending connectors interconnecting the posts and the guide rods at vertically spaced locations straddling the support.

10. The combination of claim 1 wherein said track assembly includes a pair of parallel spaced posts interconnected with each other, guide rods mounted on said posts in spaced relation thereto, and laterally extending connectors interconnecting the posts and the guide rods at vertically spaced locations straddling the anchor driving means.

11. The combination of claim 10 wherein said anchor driving means comprises a support extending laterally between the posts and the guide rods of the track assembly and mounting the buoyancy control means thereon, a fluid motor secured to the support within the buoyancy control means, and socket means driven by the fluid motor and extending downwardly therefrom below the support.

12. The combination of claim 1 wherein said anchor driving means comprises a support mounting the buoyancy control means thereon, a fluid motor secured to the support within the buoyancy control means, and socket means driven by the fluid motor and extending downwardly therefrom below the support.

13. A method of anchoring a pipeline to an underwater bottom surface utilizing a power operated anchor driving device including the steps of: driving an anchor into the bottom adjacent to the pipeline leaving an upper end of the anchor exposed above the bottom surface; tying the pipeline to said upper end of the anchor, and then driving the upper end of the anchor below the bottom surface.

14. The method of claim 13 further including the steps of: floating the power operated device to a position substantially aligned above the pipeline; submerging the device to the bottom surface; and driving the anchor into the bottom by means of the device when positioned adjacent the pipeline on the bottom surface.

15. The combination of claim 1 wherein said leg means includes outwardly and downwardly extending portions straddling the pipeline.

16. Apparatus for anchoring an underwater device to a bottom surface comprising a mounting frame having opposite ends, positioning means connected to one of the ends of said frame for engagement with the bottom surface, buoyancy means connected to the other end of the frame for floatation thereof above the bottom surface, power operated cable means mounted by the frame and connected to the underwater device for displacing the positioning means into engagement with the bottom surface against the urge of the buoyancy means, and retractable anchor driving means movably mounted on the frame for downward displacement relative to the frame when positioned by the positioning means adjacent the underwater device.

17. The combination of claim 16 including a source of fluid under pressure, conduit means connecting the source to the power operated cable means and the anchor driving means, and valve means connected to the conduit means for selectively submerging the frame and upwardly retracting the anchor driving means.

References Cited

UNITED STATES PATENTS

| | | | |
|---|---|---|---|
| 631,168 | 8/1899 | Langston | 114—206 |
| 2,851,135 | 9/1958 | Woodruff | 52—155 |
| 2,988,893 | 6/1961 | Borrmann et al. | 61—46 |
| 3,019,608 | 2/1962 | Marmion | 61—63 |
| 3,115,755 | 12/1963 | Siebenhausen | 61—46 |
| 3,118,417 | 1/1964 | Stanwick | 114—206 |
| 3,236,055 | 2/1966 | Tokola | 61—63 |

JACOB SHAPIRO, Primary Examiner

U.S. Cl. X.R.

52—155; 61—63; 1114—206